(12) United States Patent
Chen et al.

(10) Patent No.: US 7,758,834 B2
(45) Date of Patent: Jul. 20, 2010

(54) LAYERED CATALYST COMPOSITE

(75) Inventors: Shau-Lin F. Chen, Piscataway, NJ (US); Harold Rabinowitz, Montclair, NJ (US); Jin Sakakibara, Edison, NJ (US); Tian Luo, Piscataway, NJ (US); Michel Deeba, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/428,912

(22) Filed: Apr. 23, 2009

(65) Prior Publication Data
US 2009/0257933 A1 Oct. 15, 2009

Related U.S. Application Data

(63) Continuation-in-part of application No. 11/840,715, filed on Aug. 17, 2007, now Pat. No. 7,550,124, which is a continuation-in-part of application No. 11/759, 695, filed on Jun. 7, 2007, now Pat. No. 7,517,510, which is a continuation-in-part of application No. 11/507,340, filed on Aug. 21, 2006, now abandoned.

(51) Int. Cl.
*B01D 53/56* (2006.01)
*B01D 53/62* (2006.01)
*B01D 53/94* (2006.01)
*B01J 23/44* (2006.01)
*B01J 23/46* (2006.01)
*B01J 35/00* (2006.01)

(52) U.S. Cl. ............... 423/213.2; 423/213.5; 423/239.1; 423/245.3; 423/247; 502/325; 502/302; 502/303; 502/349; 502/340; 502/527.12; 60/274; 60/282; 60/299; 60/302

(58) Field of Classification Search ............... 423/213.2, 423/213.5, 239.1, 245.3, 247; 422/168, 177, 422/180, 181; 502/325, 302, 303, 349, 340, 502/527.12; 60/274, 282, 299, 302
See application file for complete search history.

(56) References Cited

U.S. PATENT DOCUMENTS 5,254,519 A    10/1993    Wan et al.

(Continued)

FOREIGN PATENT DOCUMENTS

WO    WO-2005/099870    10/2005

OTHER PUBLICATIONS

PCT/US2007/076307 PCT International Search Report, (Feb. 20, 2008), 2 pp.

(Continued)

*Primary Examiner*—Timothy C Vanoy
(74) *Attorney, Agent, or Firm*—Karen M. Whitney; Diehl Servilla LLC; Melanie L. Brown

(57) ABSTRACT

A layered, three-way conversion catalyst having the capability of simultaneously catalyzing the oxidation of hydrocarbons and carbon monoxide and the reduction of nitrogen oxides is disclosed. In one or more embodiments, the catalyst comprises three layers in conjunction with a carrier: a first layer deposited on the carrier and comprising palladium deposited on a refractory metal oxide and an oxygen storage component; a second layer deposited on the first layer and comprising rhodium deposited on a refractory metal oxide and an oxygen storage component; and a third layer deposited on the second layer and comprising palladium deposited on a refractory metal oxide.

13 Claims, 1 Drawing Sheet

U.S. PATENT DOCUMENTS

| | | | |
|---|---|---|---|
| 5,376,610 | A | 12/1994 | Takahata et al. |
| 5,597,771 | A | 1/1997 | Hu et al. |
| 5,898,014 | A | 4/1999 | Wu et al. |
| 5,948,377 | A | 9/1999 | Sung |
| 5,948,723 | A | 9/1999 | Sung |
| 5,981,427 | A | 11/1999 | Sung et al. |
| 5,989,507 | A | 11/1999 | Sung |
| 6,087,298 | A | 7/2000 | Sung et al. |
| 6,110,862 | A | 8/2000 | Chen et al. |
| 6,248,688 | B1 | 6/2001 | Wu et al. |
| 6,294,140 | B1 | 9/2001 | Mussmann et al. |
| 6,375,910 | B1 | 4/2002 | Deeba et al. |
| 6,492,297 | B1 | 12/2002 | Sung |
| 6,514,905 | B1 | 2/2003 | Hanaki et al. |
| 6,524,992 | B2 | 2/2003 | Mussmann et al. |
| 6,596,243 | B1 | 7/2003 | Fujii et al. |
| 6,625,976 | B1 | 9/2003 | Anderson et al. |
| 6,680,036 | B1 | 1/2004 | Fisher et al. |
| 6,692,712 | B1 | 2/2004 | Anderson |
| 6,764,665 | B2 | 7/2004 | Deeba et al. |
| 6,777,370 | B2 | 8/2004 | Chen |
| 6,794,330 | B2 | 9/2004 | Tanada et al. |
| 6,923,945 | B2 | 8/2005 | Chen |
| 7,022,646 | B2 | 4/2006 | Li |
| 7,081,430 | B2 | 7/2006 | Uenishi et al. |
| 7,119,044 | B2 | 10/2006 | Wei et al. |
| 7,189,376 | B2 | 3/2007 | Kumar et al. |
| 7,198,769 | B2 | 4/2007 | Cichanowicz |
| 7,517,510 | B2 * | 4/2009 | Chen et al. ............... 423/213.2 |
| 7,550,124 | B2 * | 6/2009 | Chen et al. ............... 423/213.2 |
| 2001/0006934 | A1 | 7/2001 | Kachi et al. |
| 2001/0036901 | A1 | 11/2001 | Koda et al. |
| 2001/0053340 | A1 * | 12/2001 | Noda et al. ............... 423/213.2 |
| 2003/0175192 | A1 | 9/2003 | Hu et al. |
| 2004/0001781 | A1 | 1/2004 | Kumar et al. |
| 2004/0223897 | A1 | 11/2004 | Yeo |
| 2005/0164879 | A1 | 7/2005 | Chen |
| 2005/0227867 | A1 | 10/2005 | Chen et al. |
| 2005/0282701 | A1 | 12/2005 | Foong et al. |
| 2007/0014705 | A1 | 1/2007 | Chen |
| 2007/0093382 | A1 | 4/2007 | Vanderspurt |
| 2008/0042104 | A1 | 2/2008 | Chen |

OTHER PUBLICATIONS

PCT/US2007/076307 PCT Written Opinion, (Feb. 20, 2008), 6 pp.

USPTO Non-Final Office Action mailed Jul. 24, 2008. U.S. Appl. No. 11/507,340, filed Aug. 21, 2006., 10 pgs.

USPTO Non-Final Office Action mailed Jul. 7, 2008. U.S. Appl. No. 11/840,715, filed Aug. 17, 2007, 16 pgs.

USPTO Non-Final Office Action mailed Jul. 24, 2008. U.S. Appl. No. 11/507,340, filed Aug. 21, 2006, 10 pgs.

USPTO Non-Final Office Action mailed Jul. 9, 2008. U.S. Appl. No. 11/759,695, filed Jun. 7, 2007, 17 pgs.

* cited by examiner

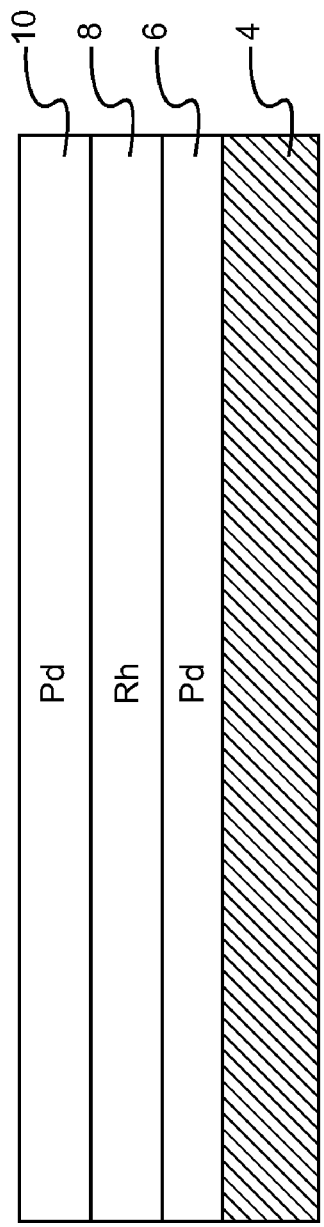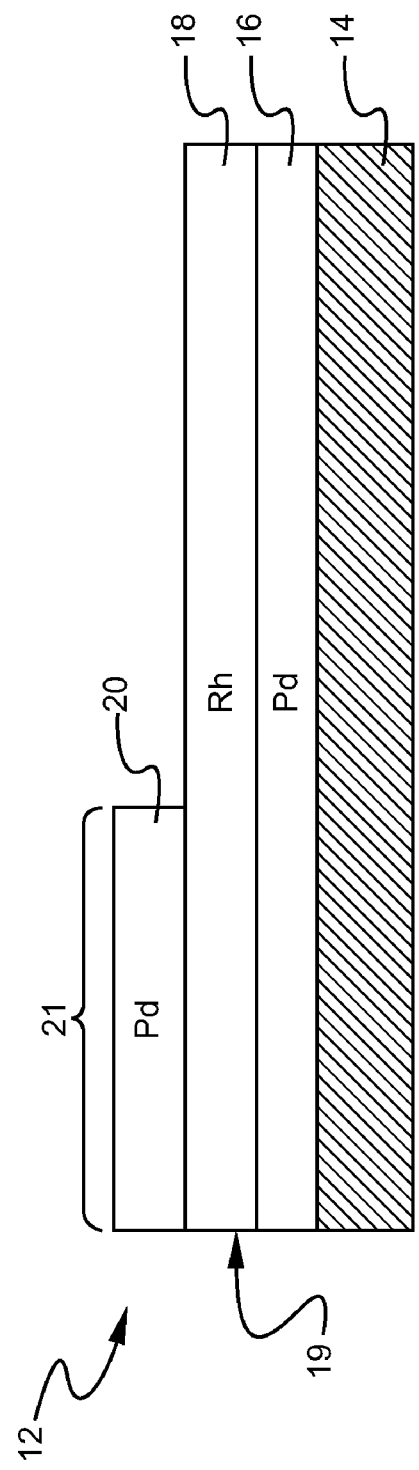

LAYERED CATALYST COMPOSITE

CROSS-REFERENCE TO RELATED APPLICATIONS

This application is a continuation-in-part of U.S. patent application Ser. No. 11/840,715 filed Aug. 17, 2007, now U.S. Pat. No. 7,550,124, which is a continuation-in-part of U.S. patent application Ser. No. 11/759,695, filed Jun. 7, 2007, now U.S. Pat. No. 7,517,510 which is a continuation-in-part of U.S. patent application Ser. No. 11/507,340, filed Aug. 21, 2006, now abandoned, all of which are hereby incorporated by reference in their entireties.

TECHNICAL FIELD

Embodiments present invention relate to a layered catalyst composite useful for the treatment of gases to reduce the level of contaminants contained therein. More specifically, embodiments of the present invention are concerned with catalysts of the type generally referred to as "three-way conversion" or "TWC" catalysts which have the capability of substantially simultaneously catalyzing the oxidation of hydrocarbons and carbon monoxide and the reduction of nitrogen oxides.

BACKGROUND

Three-way conversion catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

The high surface area alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, ceria zirconia composite, alpha alumina and other materials are known for such use. Although many of these materials suffer from the disadvantage of having a considerably lower initial BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana, neodymia, and mixtures of two or more rare earth metal oxides. For example, see C. D. Keith et al., U.S. Pat. No. 4,171,288, the entire content of which is incorporated herein by reference.

Bulk cerium oxide (ceria) is known to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694, naming C. Z. Wan et al. as inventors and incorporated herein by reference, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. Nos. 4,727,052 and 4,708,946, each incorporated herein by reference.

It is a continuing goal to develop a three-way conversion catalyst system which is inexpensive and stable at the high temperatures generated by an internal combustion engine. At the same time, the system should have the ability to oxidize hydrocarbons and carbon monoxide while reducing nitrogen oxides to nitrogen, particularly in view of stringent emissions requirements such as SULEV and LEV-II.

SUMMARY

One embodiment of the invention pertains to a layered catalyst composite comprising: (a) a carrier; (b) a first layer deposited on the carrier, the first layer comprising palladium deposited on a support; (c) a second layer deposited on the first layer, the second layer comprising rhodium deposited on a support; and (d) a third layer deposited on the second layer, the third layer comprising palladium deposited on a support. A suitable support according to one or more embodiments is a refractory oxide support.

According to one embodiment, each of the three layers is deposited in a loading of about 0.2 to about 2.5 $g/in^3$. In a specific embodiment, each of the three layers is deposited at a loading of about 0.5 to about 1.5 $g/in^3$. In another specific embodiment, each of the three layers is deposited at a loading of about 1.0 to about 2.5 $g/in^3$.

According to certain embodiments, at least one of the first, second, and third layers further comprises an oxygen storage component. In one embodiment, the first and second layers include an oxygen storage component. In an embodiment, the first layer and the second layer each independently comprises an oxygen storage component. In another embodiment, at least one layer comprises a first oxygen storage component having a first ceria content and a second oxygen storage component having a second ceria content. In a detailed embodiment, at least one layer comprises the oxygen storage component, having a ceria content in the range of 3 to 98%, in an amount in the range of 0.05 to 1.5 $g/in^3$.

The support may comprise any suitable materials, for example, a metal oxide comprising γ-alumina or promoter-stabilized γ-alumina having a specific surface area of about 50 to 300 m$^2$/g. In certain embodiments, the alumina present in the second layer comprises zirconia and lanthana stabilized γ-alumina in a loading of about 0.2 to about 2.0 g/in$^3$. For example, a suitable alumina is about 4% lanthana and about 15% zirconia stabilized gamma alumina. In one or more embodiments, the alumina present in the third layer is at a loading of about 0.2 to about 2.5 g/in$^3$ and comprises gamma alumina stabilized by baria, neodymia, lanthana, or combinations thereof. An example of a suitable alumina is about 10% baria, 7% neodymia and about 10% lanthana stabilized alumina.

In one or more embodiments, the first layer further comprises up to about 200 g/ft$^3$ of palladium and up to 70% of the total palladium in the composite. In certain embodiments, the second layer further comprises up to about 50 g/ft$^3$ of rhodium.

In one or more embodiments, the third layer further comprises up to about 330 g/ft$^3$ or between about 100% to 30% of the total palladium in the composite. According to certain embodiments, the second layer further comprises 0 to about 1.5 g/in$^3$ of an oxygen storage component with ceria content 3% to 98%. The oxygen storage component may comprise one or more oxides of one or more rare earth metals selected from the group consisting of cerium, zirconium praseodymium, lanthanum, yttrium, samarium, gadolium, dysprosium, ytterbium, niobium, neodymium, and mixtures of two or more thereof.

In a specific embodiment, the first layer further comprises up to about 0.65 g/in$^3$ of a promoter/stabilizer comprising one or more non-reducible metal oxides wherein the metal is selected from the group consisting of barium, calcium, magnesium, strontium, and mixtures thereof. The first layer may further comprise, according to one embodiment, 0 to about 0.65 g/in$^3$ of one or more promoters comprising one or more rare earth metals selected from the group consisting of lanthanum, praseodymium, yttrium, zirconium, samarium, gadolium, dysprosium, ytterbium, niobium, neodymium, and mixtures thereof.

According to one or more embodiments, the second layer comprises rhodium at a loading of up to about 50 g/ft$^3$ and platinum at a loading of up to about 50 g/ft$^3$. In certain embodiments, the second layer may further comprise up to about 0.3 g/in$^3$ of a stabilizer comprising one or more non-reducible metal oxides wherein the metal is selected from the group consisting of barium, calcium, magnesium, strontium and mixtures thereof. The second layer may further comprise up to about 0.3 g/in$^3$ of one or more promoters comprising one or more rare earth metals selected from the group consisting of lanthanum, neodymium, praseodymium, yttrium, zirconium, and mixtures/composites thereof. In another embodiment, the third layer further comprises up to about 0.65 g/in$^3$ of a promoter comprising one or more metal oxides wherein the metal is selected from the alkaline earth group consisting of barium, calcium, magnesium, strontium, and/or earth metals selected from the group consisting of lanthanum, praseodymium, yttrium, zirconium and mixtures/composites thereof. The third layer, according to an embodiment, further comprises up to about 1.5 g/in$^3$ of an oxygen storage component having a ceria content in the range of 3% to 98%. Suitable oxygen storage components may include are one or more oxides of one or more rare earth metals selected from the group consisting of cerium, zirconium praseodymium, lanthanum, yttrium, samarium, gadolium, dysprosium, ytterbium, niobium, neodymium, and mixtures of two or more thereof.

Another aspect of the invention pertains to an exhaust gas treatment article comprising a substrate comprising an inlet axial end, an outlet axial end, wall elements having a length extending between the inlet axial end to the outlet axial end and a plurality of axially enclosed channels defined by the wall elements; and an inlet composite catalyst deposited on the wall elements adjacent the inlet axial end and having a length extending less than the wall length of the wall elements, wherein the inlet catalyst composite comprises the catalyst composite described immediately above. For example, the catalyst composite may comprise (a) a carrier; (b) a first layer deposited on the carrier, the first layer comprising palladium deposited on a support; (c) a second layer deposited on the first layer, the second layer comprising rhodium deposited on a support; and (d) a third layer deposited on the second layer, the third layer comprising palladium deposited on a support.

In another embodiment, an article may further comprise an outlet catalyst composite adjacent the outlet axial end and having a length extending for less than the length of the wall elements, the outlet catalyst composite comprises a first layer deposited on the carrier, the first layer comprising palladium deposited on a support and a second layer deposited on the first layer, the second layer comprising rhodium, and optionally platinum, deposited on a support. In certain embodiments, the inlet catalyst composite overlaps the outlet catalyst composite. In a specific embodiment, the inlet catalyst composite comprises between about 10% to about 100% of the total volume (or 1 cm to 15 cm of total length) the first and second catalyst composites.

Another aspect of the invention involves a method for treating a gas comprising hydrocarbons, carbon monoxide and nitrogen oxides which comprises flowing the gas to a catalyst member, and catalytically oxidizing the hydrocarbons and carbon monoxide and catalytically reducing the nitrogen oxides in the gas in the presence of the catalyst member, the catalyst member comprising a layered catalyst composite comprising: (a) a carrier; (b) a first layer deposited on the carrier, the first layer comprising palladium deposited on a support; (c) a second layer deposited on the first layer, the second layer comprising rhodium deposited on a support; and (d) a third layer deposited on the second layer, the third layer comprising palladium deposited on a support.

Another embodiment provides a layered catalyst composite comprising:
  (a) a cordierite carrier;
  (b) a first layer deposited on the carrier, the first layer comprising:
     a palladium component deposited in an amount of up to about 200 g/ft$^3$ on a first refractory metal oxide support, and
     a first oxygen storage component comprising a ceria-zirconia composite with 40 to 50 weight % ceria, the ceria-zirconia composite being present in the first layer in an amount in the range of 0.75 to 0.9 g/in$^3$;
  (c) a second layer deposited on the first layer, the second layer comprising:
     a rhodium component deposited in an amount in the range of about 0.1 to about 50 g/ft$^3$ on a second refractory metal oxide support, and
     a second oxygen storage component comprising a ceria-zirconia composite with 35 to 45 weight % ceria, the ceria-zirconia composite being present in the second layer in an amount in the range of 0.7 to 0.9 g/in$^3$; and (a) a third layer deposited on the second layer, the third layer comprising:
  a palladium component deposited in an amount in the range of about 5 to about 100 g/ft$^3$ on a third refractory metal oxide support, and
  a third oxygen storage component comprising a ceria-zirconia composite with 40 to 50 weight % ceria, the ceria-zirconia composite being present in the third layer in an amount in the range of 0.25 to 0.4 g/in$^3$.

In a detailed embodiment, the overall precious metal loading is in the range of 15 to 300 g/ft$^3$. Other embodiments provide that palladium is present in one of the layers in an amount in the range of 5 to 10 g/ft$^3$. Still further embodiments provide that rhodium is present in one of the layers in an amount in the range of up to about 5 g/ft$^3$.

BRIEF DESCRIPTION OF THE DRAWINGS

FIG. 1 is a schematic view showing a configuration of layers on a catalytic member of an exhaust gas treatment system having Pd—Rh—Pd layering sequence for three way catalyst activity according to an embodiment of the present invention; and FIG. 2 is a schematic view showing another configuration of layers on a catalytic member according to an embodiment of the present invention.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

One or more embodiments of the present invention relate to a layered catalyst composite of the type generally referred to as a three-way conversion (TWC) catalyst. These TWC catalysts are polyfunctional in that they have the capability of substantially simultaneously catalyzing the oxidation of hydrocarbons and carbon monoxide and the reduction of nitrogen oxides. The relative layers of the catalyst composite and the specific composition of each such layer provide a stable, economical system. This enables the enhanced oxidation of hydrocarbons and carbon monoxide as well as effective conversion of nitrogen oxide compounds to nitrogen even where palladium is the only noble metal component in the composite.

Embodiments of the invention provide a layered catalyst composite designed such that there are three layers in the composite, in addition to the carrier. The first layer, also referred to as the bottom layer, is deposited on the carrier; the second layer, also referred to as the middle layer, is deposited on the first or bottom layer; the third layer, also referred to as the top or outer layer, is deposited on the second or middle layer. The layers are typically deposited in the channels of a substrate as will be described further below.

In one or more embodiments, the first and third layers include palladium and the second layer includes rhodium. Each of the first, second and third layers may optionally include platinum as discussed further below. In certain embodiments, the third layer has a higher palladium concentration and/or loading (g/ft$^3$) than the other layers. According to one or more embodiments, the third layer is intended to assist hydrocarbon conversion by reducing bulk (gas to solid) and pore diffusional momentum transfer limitations. It is believed that the bulk diffusion can be improved by increased effective gas-solid contact surface area by coating subsequent layer onto the first or second layer which tends to fill the corners of the channels. It is also believed that the pore diffusion resistance of the high-Pd layer is reduced when the overlying Rh-containing layer becomes the underlying layer, which in certain embodiments is about 100 µm to 200 µm thick in corners to about 20 µm thick at the flat edges of the channels of a honeycomb substrate. The overlying layer normally imparts a diffusional barrier to the underlying layers. This coating architecture enables higher molecular weight hydrocarbon conversion at a region closer to the gas-solid interface during cold-start, as well as, the hard acceleration conditions. Higher palladium loading in the third layer is intended to assist in hydrocarbon adsorption and conversion. In one or more embodiments, the thickness of the third layer is less than about 20 to 200 µm preferably 40 to 120 µm so that the effectiveness of the bottom two layers is not diminished. The higher palladium loading in the third layer is also intended to provide faster temperature heat up (light off) by improving convective heat transfer and by generating exothermic reaction heat when converting the pollutants such as HC, CO, and NO$_x$.

According to one or more embodiments, the bottom palladium-containing layer provides additional surface area to disperse any additional palladium. The bottom layer is intended to convert lower molecular weight hydrocarbons and to convert NO$_x$ by coupling palladium with other promoter additives such as lanthana, strontia, baria, and oxygen storage components (OSCs), as discussed further below. In one or more embodiments, the OSC amount is about 0.15 to 1.5 grams per cubic inch (gci) in the bottom layer, with 0.65 to 1.0 gci as a specific range. It is believed that the bottom layer also serves as another function to occupy the corner of a coating cell in honeycomb substrates so that the subsequent layers can more evenly spread out to the full perimeter of the coating cell, increasing the gas-solid and solid-solid surface area.

In one embodiment, the middle layer contains a relatively high amount of oxygen storage component to promote NO$_x$ and CO conversion. In one or more embodiments, the OSC contains ceria/zirconia composite with ceria content ranging from 3% to 98%, more specifically, 5% to 45% at a loading of about 0.1 to 1.5 gci. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity). In a detailed embodiment, at least one layer comprises a mixture of oxygen storage component composites having different compositions, for example, differing amounts of ceria content. For example, it may be desirable to provide a first ceria-zirconia composite having 5% ceria content and a second ceria-zirconia composite having 40% ceria content.

In one embodiment, ceria is present in a ceria-zirconia composite of one or more layer in the range of 40 to 50% by weight, where the ceria-zirconia composite can be loaded in the layer in the range of 0.75 to 0.9 g/in$^3$, or even in the range of 0.25 to 0.4 g/in$^3$. In other embodiments, ceria is present in a ceria-zirconia composite of one or more layer in the range of 35 to 45% by weight, where the ceria-zirconia composite can be loaded in the layer in the range of 0.7 to 0.9 g/in$^3$.

In accordance with embodiments of the present invention, an exhaust gas treatment system or article is provided containing a catalytic member or catalytic converter comprising a substrate on which is coated one or more washcoat layers, each containing one or more catalysts for the abatement of pollutants, especially NOx, HC, and CO. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

The catalytic member according to an embodiment of the invention may be more readily appreciated by reference to the Figures, which are merely exemplary in nature and in no way intended to limit the invention or its application or uses. Referring in particular to FIG. 1, a configuration of the catalytic member 2 of an exhaust gas treatment system is shown in accordance with one embodiment of the present invention. The catalytic member 2 comprises a substrate 4, typically a honeycomb monolith substrate, which is coated with a first or bottom washcoat layer 6, containing palladium, and optional other precious metal, and a second or middle washcoat layer 8 also containing rhodium, and optional other precious metal, and optionally an oxygen storage component (OSC). The precious metal catalysts and oxygen storage components used in the practice of embodiments of the present invention are discussed in more detail below.

The catalytic member 2 shown in FIG. 1 further comprises a third layer 10, which is applied or coated over the middle washcoat layer for the mitigation of HC conversion of the underlying catalyst. The third layer 10 comprises palladium on a support such as a highly porous refractory oxide (e.g., alumina) and base metal oxides (e.g., SrO, $La_2O_3$, $Nd_2O_3$, or BaO), which can be coated over the catalytically coated substrate 4 to provide additional catalytic activity toward HC, CO and $NO_x$. In this embodiment of the invention, the bottom washcoat layer 6, middle washcoat layer 8, and overcoat are coated over the entirety of the axial length of the substrate 4. The precious metal and OSC-containing layers will generally contain a precious metal loading of from about 2 to 500 $g/ft^3$. Loadings of precious metal from 1 to 100 $g/ft^3$ and 30 to 60 $g/ft^3$ are also exemplified. OSC loading levels are typically from 0 to 4 $g/in^3$, with 0.2 to 1.0 $g/in^3$ also exemplified.

Optionally, the coating process can be manipulated such that the third layer is applied over only a fraction of the second layer. In this embodiment, the third layer can be applied or coated to the upstream portion of the substrate, thereby creating an upstream poison capture zone. As used herein, the terms "upstream" and "downstream" refer to relative directions according to the flow of an engine exhaust gas stream. The third layer was introduced again to enhance $HC/CO/NO_x$ activity this upstream zone where turbulent mass transfer occurs.

As shown in FIG. 2 the third layer 20 is coated only over the upstream portion of the substrate thereby creating a high Pd containing zone 21. The third layer 20 comprises a layer comprising a support such as a highly porous refractory oxide (e.g., alumina), one or more base metal oxides (e.g., SrO or BaO), and optional an oxygen storage component. Typically, the coated portion or front zone 21 comprises a length of at least 0.5 inches, and up to a length of about 5.0 inches, from the upstream edge 19 of catalytic member 12. Coated portions or front zones 21 of at least one, two, three or four inches from the upstream edge 19 of catalytic member 12 are also exemplified. In this embodiment, the bottom washcoat Pd layer 16, and middle washcoat Rh layer 18 cover the entirety of the axial length of the substrate 14. The bottom layer typically contains Pd or optionally Pt for the abatement of pollutants, e.g., NOx, HC, and CO. The middle washcoat layer 18 typically contains rhodium and optionally Pt and optionally an oxygen storage component (OSC). The level of the precious metals and oxygen storage component used in the practice of this embodiment of the present invention are typically the same as described for FIG. 1.

The length of the third layer coated front zone 21, that being the portion of the catalytic member, can also be described as a percentage of the length of the catalytic member from the upstream to downstream edge. Typically, the front triple-layered front zone 21 will comprise from about 3% to about 70% of the length of the catalytic member. Also exemplified are front zones comprising from about 10% to about 60% and from about 10% to about 50% of the upstream axial length of the catalytic member. Front zones of up to about 50% of the length, or 15 cm of total length, of the catalytic member are also exemplified.

Details of the components of a gas treatment article according to embodiments of the invention are provided below.

The Carrier

According to one or more embodiments, the carrier may be any of those materials typically used for preparing TWC catalysts and will typically comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 1200 or more gas inlet openings (i.e., "cells") per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

The carriers useful for the layered catalyst composites of embodiments of the present invention may also be metallic in nature and be composed of one or more metals or metal alloys. The metallic carriers may be employed in various shapes such as corrugated sheet or monolithic form. Exemplary metallic supports include the heat resistant metals and metal alloys such as titanium and stainless steel as well as other alloys in which iron is a substantial or major component. Such alloys may contain one or more of nickel, chromium and/or aluminum, and the total amount of these metals may comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 10000 and higher, to improve the corrosion resistance of the alloy by forming an oxide layer on the surface the carrier. Such high temperature-induced oxidation may enhance the adherence of the refractory metal oxide support and catalytically-promoting metal components to the carrier.

The First Layer

According to one or more embodiments, the first layer which is deposited upon, i.e., coated upon and adhered to, the carrier comprises platinum and/or palladium deposited on a support. A suitable support is a high surface area refractory metal oxide. In a specific embodiment, the loading of the first layer upon the carrier is between about 0.2 to about 2.5 g/in$^3$. Examples of high surface refractory metal oxides include, but are not limited to, a high surface area refractory metal oxide such as alumina, silica, titania and zirconia and mixtures thereof. The refractory metal oxide may consist of or contain a mixed oxide such as silica-alumina, aluminosilicates which may be amorphous or crystalline, alumina-zirconia, alumina-lanthania, alumina-baria-lanthania-neodymia, alumina-chromia, alumina-baria, alumina-ceria, and the like. An exemplary refractory metal oxide comprises gamma alumina having a specific surface area of about 50 to about 300 m$^2$/g and which is present in a loading of about 0.5 to about 2.5 g/in$^3$ The first layer typically will have oxygen storage components range 0.25 to 1.5 gci, with ceria content ranging form 3% to 98%.

Examples of platinum and palladium loading in the first layer include up to about 200 g/ft$^3$, alternatively, between about 3 and about 120 g/ft$^3$, of palladium, and between up to about 10 g/ft$^3$, alternatively, between about 1 and about 6 g/ft$^3$, of platinum. This layer may also contain up to about 0.65 g/in$^3$ of a stabilizers/promoters. Suitable stabilizers include one or more non-reducible metal oxides wherein the metal is selected from the group consisting of barium, calcium, magnesium, strontium, and mixtures thereof. In one or more embodiments, the stabilizer comprises one or more oxides of barium and/or strontium. Suitable promoters include one or more non-reducible oxides, or rare earth metals selected from the group consisting of lanthanum, neodymium, praseodymium, yttrium, zirconium samarium, gadollium, dysprosium, ytterbium, niobium, and mixtures thereof.

The Second Layer

The second layer, which is deposited upon, i.e., coated upon and adhered to, the first layer, comprises rhodium or rhodium and platinum deposited on a high surface area refractory metal oxide and/or oxygen storage component which may be any of those mentioned above with respect to the first layer. The second layer will be present in a loading of about 0.2 to about 2.5 g/in$^3$, alternatively, between about 1 and about 1.6 g/in$^3$ and will have substantially amount of oxygen storage components at a loading of about 0.05 to about 1.5 g/in$^3$. Oxygen storage components can be ceria containing ceria/zirconia composite with ceria ranged from about 3% to 100% as weight percent. Preferably, 5% to 55% of ceria in the composite. The second layer also can comprise gamma alumina or stabilized gamma-alumina having a specific surface area of about 50 to about 300 m$^2$/g and which is present in a loading of about 0.3 to about 2.2 g/in$^3$.

In one or more embodiments, the rhodium and platinum will be present in the second layer in a loading of about 0.1 to about 50 g/ft$^3$, alternatively about 2 to 15 g/ft$^3$ of rhodium, and about 0 to about 10 g/ft$^3$, preferably about 1 to about 6 g/ft$^3$, of platinum. The second layer may also contain about 0 to about 0.3 g/in$^3$ of a promoter(s). Suitable promoters include one or more base metal oxides wherein the metal is selected from the group consisting of barium, calcium, magnesium, strontium, one or more rare earth metals selected from the group consisting of zirconium, lanthanum, praseodymium, yttrium, somarium, gadolium, dysprosium, ytterbium, niobium, neodynium, and mixtures thereof.

The Third Layer

The third layer, which is deposited upon, i.e., coated upon and adhered to, the second layer, comprises (i) palladium or palladium with relatively lower platinum and/or rhodium deposited on a high surface area refractory metal oxide and optional a potion of precious metal deposited on (ii) an oxygen storage component. The third layer will be present in a loading of about 0.2 to about 2.5 g/in$^3$. In one or more embodiments, the metal oxide employed for the third layer comprises gamma alumina or stabilized alumina having a specific surface area of about 60 to about 300 m$^2$/g and which is present in a loading of about 0.15 to about 2.0 g/in$^3$.

The palladium may be present in the third layer in a loading of about 2 to about 200 g/ft$^3$, alternatively about 5 to about 100 g/ft$^3$, of platinum and/or rhodium and about 0.5 to about 15 g/ft$^3$, alternatively about 2 to about 8 g/ft$^3$, of platinum plus rhodium. The oxygen storage component will be present in the third layer in an amount of about 0 to about 1.5 g/in$^3$, for example, from 0.1 to 0.5 g/in$^3$. Typically the oxygen storage component will comprise one or more rare earth metals, such as ceria, a mixed oxide of cerium and zirconium and a mixed oxide of cerium, zirconium, lanthanum, praseodymium, samarium, gadollium, dysprosium, ytterbium, niobium, and neodymium.

The third layer may also contain about 0 to about 0.3 g/in$^3$ of a stabilizer comprising one or more non-reducible metal oxides and/or rare earth oxides wherein the metal is selected from the group consisting of barium, calcium, magnesium, strontium, lanthanum, praseodymium, yttrium, zirconium, neodymium, and mixtures thereof. Those promoters can be introduced as either soluble or non-soluble forms into slurries such as metal nitrates, acetate, hydroxide, carbonates, sulfates, or preferably as composite derived from calcining promoters into alumina when forming the stabilized and doped gamma-alumina.

Preparation of the Layered Catalyst Composite

The layered catalyst composite of the present invention may be readily prepared by processes well known in the prior art. A representative process is set forth below.

The catalyst composite can be readily prepared in layers on a monolithic carrier. For the first layer, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$. To incorporate components such as palladium or palladium and platinum, stabilizers, promoters, and/or binders, such components may be incorporated in the slurry as a mixture of water soluble or water-dispersible compounds or complexes. Thereafter the coated carrier is calcined by heating, e.g., at 500-600° C. for about 1 to about 3 hours. Typically, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are utilized. For example, suitable compounds are palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A suitable method of preparing the first layer of the layered catalyst composite of the invention is to prepare a mixture of a solution of a palladium compound or palladium and platinum compounds and at least one finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, a promoter, e.g., lanthanum nitrate, and/ or a binder may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt. %, more particularly about 35-45 wt. %.

The second layer may be prepared and deposited upon the first layer in the same manner as described above for deposition of the first layer upon the carrier. The second layer will contain the rhodium or rhodium and platinum components and optionally, the stabilizer, promoter, and binder components described above. Water-soluble compounds or water-dispersible compounds or complexes of the metal component of the type listed above for the first layer may be used for the platinum component. For the rhodium component, aqueous solutions of soluble compounds or complexes of the rhodium chloride, rhodium nitrate, hexamine rhodium chloride, etc. may be used. In one or more embodiments of the present invention, at least one oxygen storage component of the type described above is present in the second and/or the third layer along with the platinum group metal components.

The third layer may be prepared and deposited upon the second layer in the same manner as that described above for deposition of the first layer upon the carrier. The same stabilizer, promoter, and binder components described above may optionally be present in the third layer.

The following non-limiting examples shall serve to illustrate the various embodiments of the present invention. In each of the examples, the carrier was cordierite with 6.5 mil wall thickness and 400 cells per square inch. The layered catalyst composite in Examples 1 to 3 all contained palladium and rhodium with a total precious metal loading of 100 g/ft$^3$ and with palladium to rhodium ratio of 4:1, respectively.

EXAMPLE 1

First Layer

The components present in the first layer were 10% baria stabilized gamma alumina, lanthanum oxide, strontium oxide, zirconium oxide, neodymium oxide, a composite of cerium and zirconium oxide with approximately 30% ceria content and palladium at the concentrations of 64%, 6.4%, 6.4%, 2.6%, 6.4%, 12.8% and 1.1%, respectively, based on the calcined weight of the catalyst. The palladium (30 g/ft$^3$) in the form of palladium nitrate solutions were impregnated by planetary mixer (P-mixer) onto the stabilized alumina to form a wet powder while achieving incipient wetness. The other components such as promoters and stabilizers were introduced as their soluble salts using water as the slurrying vehicle. The aqueous slurry was formed by combining all above components and milled to a particle size of 90% less than 9 microns and coated onto the cordierite carrier. After coating, the carrier plus the first layer was calcined at a temperature of 550° C. for at least 2 hours.

Second Layer

The components present in the second layer were stabilized gamma alumina, zirconium oxide, alumina oxide as binders, a composite of cerium and zirconium oxide with ~30% ceria content and rhodium at the concentrations of 26.1%, 0.7%, 69.3%, and 0.9%, respectively, based on the calcined weight of the catalyst. The catalyst was prepared by impregnating rhodium (20 g/ft$^3$) in the form of rhodium nitrate by P-mixer onto stabilized alumina and composite cerium and zirconium separately with a distribution of 30/70 ratio. The rhodium-alumina and rhodium-ceria-zirconia powders were each added into a basic solution containing monoethanolamine (MEA) around three times of rhodium weight and mixed for 10 minutes. Zirconium hydroxide 0.7% wt % as of total solid was added into slurry containing rhodium-alumina. Each slurry then was acidified to bring pH range to 4~5 for milling. The aqueous slurry was individually milled to a particle size of 90% less than 9 microns then were combined. The resultant slurry having a solids content of about 28% can be either milled briefly again or homogenized to ensure particle size to be 90% less than 9 microns. It was thereafter coated onto the first layer. The resultant carrier plus first layer and second layer was calcined at 450° C. for no less than 2 hours.

Third Layer

After cooling, the third layer was coated onto the second layer. The components present in the third layer were gamma alumina doped with 10% baria-10% lanthana-7% neodymia, strontia, mixed oxide of cerium and zirconium, zirconia, and palladium at the concentrations of 65.6%, 6.7%, 24.6, 0.8% and 2.4%, based on the finished calcined weight of the third layer. The aqueous slurry containing palladium (50 g/ft$^3$) was produced in the same manner as the slurry for first layer. The aqueous slurry was milled to a particle size of less than 9 microns and coated onto the second layer. After coating, the carrier plus the first layer and the second layer was calcined at a temperature of 550° C. for 2 hours.

COMPARATIVE EXAMPLE 2

The layered catalyst composite contained a total precious metal loading of 100 g/ft$^3$ of palladium and rhodium in a ratio of 4:1, respectively.

First Layer

The components present in the first layer were gamma alumina, zirconium oxide, ceria oxide, neodymium oxide, lanthanum oxide, a mixed oxide of cerium and zirconium with 20% ceria, and palladium at the concentrations of 20.4%, 9.1%, 9.1%, 12.6%, 12.6% 34%, and 2.33%, respectively, based on the calcined weight of the catalyst. The palladium (80 g/ft$^3$) in the form of nitrate salts, was impregnated by planetary-mixer onto the stabilized-alumina and ceria-zirconia composites with sufficient dilution water to wet most the particles. Those Pd-containing powders were mixed with other components, introduced as soluble nitrate or acetate salts, and formed an aqueous slurry having a solids content of about 42%. The slurry was milled to a particle size of 90% less than 9 microns and coated onto the cordierite carrier. After coating, the carrier plus the first layer was calcined at a temperature of 550° C. for no less than 2 hrs.

Second Layer

The components present in the second layer were zirconium oxide as hydroxide, a mixed oxide of cerium and zirconium composite with 30% ceria, zirconium oxide as zirconium nitrate binder, and rhodium at the concentrations of 6.2%, 92.3%, 0.4%, and 1.2%, respectively, based on the calcined weight of the catalyst. The rhodium (20 g/ft$^3$) in the form of nitrate salts, was impregnated by planetary-mixer onto the ceria-zirconia composites with sufficient dilution water to wet most the particles. Those Rh-containing powders were added to a slurry containing zirconium hydroxide. After mixing for 20 minutes, binder in the form of zirconium nitrate was introduced into slurry and make the solid content of about 32%. The aqueous slurry was milled to a particle size of 90% less than 12 microns and coated onto the first layer. After coating, the carrier plus the first layer and the second layer was calcined at a temperature of 430° C. for no less than 2 hours.

COMPARATIVE EXAMPLE 3

This example pertains to a second reference catalyst. This reference catalyst had the same precious metal loading and ratio as catalyst in Example 1. The only difference introduced in this catalyst being the 2$^{nd}$ and 3$^{rd}$ layer were coated in the reversed order. As a result, the final construction became a first palladium (30 grams per cubic foot (gcf)), a second palladium (50 gcf), and a third rhodium (20 gcf) layer.

Evaluation

Prior to evaluation, the layered catalyst composites of Example 1 and Comparative Examples 2-3 were aged on a gasoline engine at 900° C. for 50 hours. The evaluations were performed on a 2.3 L engine vehicle using the US FTP-75 testing procedure. The total amount of hydrocarbons, carbon monoxide and nitrogen oxides was measured by collecting three bags and the weighed average was calculated. The results of the evaluations are set forth in Table I below with all the emissions in g/mile units, and for 3 bags total.

TABLE I

| Example | Layer (1/2/3) | NO$_X$ | THC | CO/10 |
|---|---|---|---|---|
| 1 | Pd/Rh/Pd | 0.130 | 0.039 | 0.035 |
| 2 | Pd/Rh | 0.188 | 0.044 | 0.036 |
| 3 | Pd/Pd/Rh | 0.143 | 0.051 | 0.045 |

(all 100 gcf Pd/Rh = 4/1)

The results of the evaluation, as shown in Table I, show that the layered catalyst composite of Example 1 exhibited the best performance and showed significant improvement in the reduction of NO$_x$, HC and CO emissions as compared with the conventional case of double layered Example 2 (Pd/Rh) and a triple layered Example 3 (Pd/Pd/Rh) catalysts, with latter two catalysts sharing the common feature of Rh-top layer.

While the present invention should not be limited by any particular theory, it is believed that the addition of Pd-containing top layer improved the performance of three-way catalyst and increased Pd effectiveness not only by providing an additional layer of support materials to increase surface area for better overall Pd dispersion, but also by bringing high amount of Pd close to gas-solid bulk diffusion interface to reduce pore diffusion resistance. On the other hand, the Pd first layer, provides extra active sites for small HC conversion and some interaction with ceria-zirconia composite to contribute for additional NOx activity. It is also believed that the first layer furthermore served as a "filler coat" so that the second Rh-layer can be pushed out from corners of the channels, spread out and distribute better on cell wall for better washcoat efficiency. The middle layer, meanwhile, provided additional CO/NO$_x$ and HC conversions by rhodium, especially with its strong CO/NOx selectivity/activity and its interaction with ceria/zirconia composite. Based on the results shown in Table I, the Pd—Rh—Pd layered catalyst composite of the present invention is more effective in reducing hydrocarbon, CO and NOX emissions than other layer architectures.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A layered catalyst composite comprising:
   (a) a cordierite carrier;
   (b) a first layer deposited on the carrier, the first layer comprising:
      a palladium component deposited in an amount of up to about 200 g/ft$^3$ on a first refractory metal oxide support, and
      a first oxygen storage component comprising a ceria-zirconia composite with 40 to 50 weight % ceria, the ceria-zirconia composite being present in the first layer in an amount in the range of 0.75 to 0.9 g/in$^3$;
   (c) a second layer deposited on the first layer, the second layer comprising:
      a rhodium component deposited in an amount in the range of about 0.1 to about 50 g/ft$^3$ on a second refractory metal oxide support, and
      a second oxygen storage component comprising a ceria-zirconia composite with 35 to 45 weight % ceria, the ceria-zirconia composite being present in the second layer in an amount in the range of 0.7 to 0.9 g/in$^3$; and
   (a) a third layer deposited on the second layer, the third layer comprising:
      a palladium component deposited in an amount in the range of about 5 to about 100 g/ft$^3$ on a third refractory metal oxide support, and
      a third oxygen storage component comprising a ceria-zirconia composite with 40 to 50 weight % ceria, the ceria-zirconia composite being present in the third layer in an amount in the range of 0.25 to 0.4 g/in$^3$.

2. The composite of claim 1 wherein each of the three layers is deposited in a loading of about 1.0 to about 2.5 g/in$^3$.

3. The composite of claim 1 wherein the first, second, and third refractory metal oxide supports each independently comprises a metal oxide comprising γ-alumina or promoter-stabilized γ-alumina having a specific surface area of about 50 to 300 m$^2$/g.

4. The composite of claim 3 wherein the second support comprises activated alumina that is stabilized by zirconia, lanthana, or combinations thereof, the alumina being present in a loading of about 0.2 to about 2.0 g/in$^3$.

5. The composite of claim 3 wherein the first support, the third support, or both comprises activated alumina that is stabilized by baria, neodymia, lanthana, the alumina being present in a loading of about 0.2 to about 2.5 g/in$^3$.

6. The composite of claim 1 comprising an overall precious metal loading in the range of 15 to 300 g/ft$^3$.

7. The composite of claim 1 wherein the first layer comprises palladium in an amount in the range of 5 to 10 g/ft$^3$.

8. The composite of claim 1 wherein the second layer comprises rhodium in an amount of up to about 5 g/ft$^3$ of rhodium.

9. The composite of claim 1 wherein the third layer comprises palladium in an amount in the range of 5 to 10 g/ft$^3$.

10. The composite of claim 1 wherein the first layer further comprises 0 to about 0.65 g/in$^3$ of a promoter/stabilizer comprising one or more non-reducible metal oxides wherein the metal is selected from the group consisting of barium, calcium, magnesium, strontium, and mixtures thereof.

11. The composite of claim 1 wherein the first layer further comprises 0 to about 0.65 g/in$^3$ of one or more promoters comprising one or more rare earth metals selected from the group consisting of lanthanum, praseodymium, yttrium, zirconium, neodymium, and mixtures thereof.

12. The composite of claim 1 wherein the second layer further comprises 0 to about 0.3 g/in$^3$ of one or more promoters comprising one or more rare earth metals selected from the group consisting of lanthanum, neodymium, praseodymium, yttrium, zirconium and mixtures/composites thereof.

13. A method for treating a gas comprising hydrocarbons, carbon monoxide and nitrogen oxides which comprises flowing the gas to the catalyst composite of claim 1, and catalytically oxidizing the hydrocarbons and carbon monoxide and catalytically reducing the nitrogen oxides in the gas in the presence of the catalyst member

\* \* \* \* \*